US008433341B2

(12) United States Patent  (10) Patent No.: US 8,433,341 B2
Dredge  (45) Date of Patent: Apr. 30, 2013

(54) SYSTEM AND METHODS FOR DISTRIBUTED TRACKING OF PUBLIC TRANSIT VEHICLES

(75) Inventor: Robert Dredge, Somerville, MA (US)

(73) Assignee: Universal Metaphor, LLC, Somerville, MA (US)

( * ) Notice: Subject to any disclaimer, the term of this patent is extended or adjusted under 35 U.S.C. 154(b) by 422 days.

(21) Appl. No.: 12/701,206

(22) Filed: Feb. 5, 2010

(65) Prior Publication Data

US 2010/0197325 A1  Aug. 5, 2010

Related U.S. Application Data

(60) Provisional application No. 61/150,103, filed on Feb. 5, 2009.

(51) Int. Cl.
*H04W 24/00* (2009.01)
(52) U.S. Cl.
USPC ............... 455/456.3; 455/456.1; 455/456.6
(58) Field of Classification Search ..... 455/456.1–456.6
See application file for complete search history.

(56) References Cited

U.S. PATENT DOCUMENTS

| 6,006,159 | A | 12/1999 | Schmier et al. ............... 701/200 |
| 8,131,307 | B2 * | 3/2012 | Lubeck et al. ............. 455/456.2 |
| 2002/0022489 | A1 * | 2/2002 | Odashima et al. ............ 455/456 |
| 2003/0153330 | A1 * | 8/2003 | Naghian et al. ............... 455/456 |
| 2004/0044467 | A1 * | 3/2004 | Laird ............................ 701/207 |
| 2006/0217885 | A1 | 9/2006 | Crady et al. .................. 701/213 |

* cited by examiner

*Primary Examiner* — Steven Lim
(74) *Attorney, Agent, or Firm* — Sunstein Kann Murphy & Timbers LLP

(57) ABSTRACT

A system and methods are provided for collecting and aggregating the movements of location-aware wireless devices and corroborating them with the routes of public transit vehicles. Individual public transit agencies transmit details of their covered routes, including scheduled times and stop locations, to a central processing system. Individual end users of public transit systems carry their own mass-produced, location-aware wireless devices that transmit their location and other relevant information to the central processing system for analysis. The central processing system assigns the specific devices to transit vehicles, uses their locations to determine the actual locations of the vehicles they are traveling on, and communicates this information to the end user of the device, and other users.

39 Claims, 7 Drawing Sheets

SYSTEM AND METHODS FOR DISTRIBUTED TRACKING OF PUBLIC TRANSIT VEHICLES

CROSS-REFERENCE TO RELATED APPLICATION

This application claims the benefit of U.S. Provisional Application No. 61/150,103, filed Feb. 5, 2009, which is incorporated herein by reference in its entirety.

BACKGROUND OF THE INVENTION

1. Field of the Invention

The present invention relates in general to the tracking of public transit vehicles, and more particularly to inferring, from devices transiently present on those vehicles, both the location of those vehicles and any deviation from previously published schedules, and the automated provisioning of this information to interested end users.

2. Description of Related Art

A significant impediment to the use of public transit remains the possibility of vehicles arriving later or earlier than their scheduled times. A commuter may be aggravated by arriving late at a destination, missing a train or bus, or simply by investing time waiting for a late vehicle. The latter kind of waiting both reduces the time until the vehicle arrives, and increases the likelihood of failing to reach the destination on time. As time passes, this cost-benefit conflict becomes more acute, resulting in ever-increasing anxiety. So common is this last type of irritation that psychologists have given it a name: "The Rosencrantz and Guildenstern effect" (named after the following passage in the play Rosencrantz and Guildenstern are Dead by Tom Stoppard: "We've traveled too far, and our momentum has taken over; we move idly towards eternity, without possibility of reprieve or hope of explanation.")

FIG. 1 illustrates example situations in which public transit vehicles deviate from their scheduled routes, possibly causing aggravation for commuters. Four trips are shown, with distance traveled on the horizontal axis and time increasing down the vertical axis. Published schedules are shown by dashed lines, while the actual position of each vehicle is shown by a solid line.

Trip #1 departs on time but moves slowly between stops #1 and #2, arriving a few minutes late at stop #2. It loads and unloads passengers in the allotted amounts of time at each stop, but remains a few minutes behind schedule all the way to stop #4.

Trip #2 also departs on time and moves slowly between stops #1 and #2. It spends a long time unloading and loading passengers at stop #2. However, it moves quickly, arriving at stop #3 at its scheduled departure time, and catching up to schedule by stop #4.

Trip #3 beats its schedule to stop #2 and waits until its scheduled departure time until continuing. It then arrives at stop #3 behind schedule, but unloads and loads passengers quickly and proceeds to stop #4 exactly on schedule.

Trip #4 leaves stop #1 behind schedule and is on track to arrive late at stop #2.

Current technologies that address the problem of public transit vehicles arriving before or after scheduled times use Automatic Vehicle Locating (AVL) systems. The implementation of these systems involves significant infrastructure development on the part of the agency that operates the vehicles. Typically, permanent transceivers are installed in each vehicle that must be tracked, and the locations of the vehicles are determined using Global Positioning System (GPS) satellites. This position information is transmitted back to a central facility using a satellite, terrestrial radio or cellular connection from the vehicle to a radio receiver, satellite or nearby cell tower. After capture, the location data of vehicles is processed and made available to end users via signage, phone recordings, or Internet sites. One example of such a system is disclosed in U.S. Pat. No. 6,006,159 to Schmier et al., which teaches a system for notifying passengers waiting for public transit vehicles of the status of the vehicles using a GPS device installed in each vehicle. A similar system is disclosed in U.S. Patent Application Publication 2006/0217885 to Crady et al., which teaches end users querying a vehicle position aggregation system that receives data from GPS devices installed in vehicles belonging to different vehicle fleets.

These existing solutions to the problem of tracking public transit vehicles are extremely capital-intensive for fleet operators. Transit agencies, which are notoriously underfinanced, must equip every vehicle with a robust, permanent GPS receiver, processor, and a transmitter to relay their position to the central tracking system, and maintain and upgrade these devices. Transit agencies must also internalize the costs of buying or leasing large, central data aggregation systems. Further, ongoing operation requires the payment of data transmission fees, either to lease wireless frequencies directly or to sublease them from another operator.

Many transit agencies make Internet-based route and schedule publications and databases available to the public on the Internet. The most advanced sites include web pages that are capable of planning an entire door-to-door trip, including transfers between vehicles. Several of these transit agencies have standardized their published data formats so that they may be used by other utilities, such as the Google Transit™ trip planning service provided by Google Inc. of Mountain View, Calif.

Further, there are a proliferation of consumer devices, typically mobile cellular phones with advanced capabilities, that are both aware of their own locations using maps of urban wireless service environments, and capable of transmitting information to distant servers wirelessly. At present, there are millions of these small devices that have sufficient capabilities to perform a transit agency's vehicle tracking needs without requiring the agency to incur any expense. At any given moment, thousands of these devices are already transiently present on public transit vehicles and operating without any investment from the operating transit agencies.

BRIEF SUMMARY OF THE INVENTION

Therefore, in accordance with embodiments of the invention, many transient, location-aware devices are used to track the position of public transit vehicles. Individual public transit agencies transmit details of their covered routes, including scheduled times and stop locations, to a central processing system. Individual end users of public transit systems carry their own mass-produced, location-aware wireless devices that transmit their location and other relevant information to the central processing system for analysis. The central processing system assigns the specific devices to transit vehicles, uses their location to determine the actual location of the vehicles they are traveling on, and communicates the information to the end user and other users.

A first embodiment of the invention is a method for providing information to an individual who is riding, or preparing to ride, one of a plurality of public transit vehicles, each vehicle in the plurality of vehicles having a scheduled route. The method includes the steps of receiving timestamped location data from a location-aware device possessed by the individual; in a computer process, determining a vehicle in the plurality of vehicles that corresponds to the timestamp and the location data; and transmitting, to the location-aware device, information regarding the timeliness of the vehicle along its scheduled route. The public transit vehicle may be an automobile, a bus, a train, an airplane, or a boat. The location-aware device may be a smartphone. The location-aware device does not have to be located within the public transit vehicle.

There are several ways to determine the correct vehicle. One way is receiving, from the location-aware device, a textual identifier of the vehicle. In a second way, the timestamped location data corresponds to a location served by only one scheduled route. In a third way, the timestamped location data corresponds to a combined time and location unambiguously served by only one scheduled route. Or, if the timestamped location data corresponds to a time and a location served by several scheduled routes, one may choose a vehicle from among the several scheduled routes. Determining the vehicle may include determining that the vehicle is the same as a vehicle previously determined using location data from the location-aware device. Or, it may include correlating location data received from at least one other, co-moving location-aware device.

In a related embodiment, the information includes an estimated time of arrival at a regular stopping location along the route, such as the individual's final destination on the public transit vehicle. Another related embodiment may include the additional steps of transmitting information regarding the timeliness of the vehicle along its scheduled route to a device possessed by a second individual. This information may include data, an actual or synthesized human voice, musical tones, or dynamically-generated images or video. An embodiment may also include receiving, from the first individual's location-aware device, second information relating to a condition of the public transit vehicle or its passengers, and transmitting the second information to the second individual's device.

Another method embodiment provides information regarding a plurality of public transit vehicles, each vehicle in the plurality of vehicles having a scheduled route. This method has four steps. First, it includes receiving a collection of timestamped location data from a plurality of location-aware devices, each location-aware device possessed by an individual riding one of the plurality of public transit vehicles. Next it includes determining, in a computer process, for each vehicle in the plurality of vehicles, which location data corresponds to that vehicle, thereby determining a collection of stops remaining on the scheduled route of the vehicle. Next, it includes computing, in a computer process, for each vehicle in the plurality of vehicles, an estimated time of arrival for a stop in the collection of stops. Finally, it includes transmitting at least one of the estimated times of arrival to a second device not in the plurality of location-aware devices.

The plurality of location-aware devices may include a smartphone. The second device need not be located within any of the plurality of public transit vehicles. Determining which location data corresponds to a given vehicle may include receiving, from a location-aware device, a textual identifier of the given vehicle, or correlating location data received from a plurality of location-aware devices possessed by individual riders of the given vehicle.

The embodiment may be extended by transmitting information regarding the timeliness of one of the vehicles along its scheduled route to the second device. It may be further extended by receiving, from the location-aware devices possessed by a plurality of individuals riding on one of the plurality of public transit vehicles, information relating to a condition of the vehicle or its passengers, and transmitting the information to the second device.

A computer program product embodiment, embodied in a tangible, computer-readable medium, is further provided. This product includes program code for performing several functions. One function is receiving a collection of timestamped location data from a plurality of location-aware devices, each location-aware device possessed by an individual riding one of the plurality of public transit vehicles. A second function is determining, for each vehicle in the plurality of vehicles, which location data corresponds to that vehicle, thereby determining a collection of stops remaining on the scheduled route of the vehicle. A third function is computing, for each vehicle in the plurality of vehicles, an estimated time of arrival for a stop in the collection of stops. A fourth function is transmitting at least one of the estimated times of arrival to a second device not in the plurality of location-aware devices.

The program code for determining the vehicle may use a textual identifier of the vehicle received from the location-aware device, or for determining that the timestamped location data corresponds to a time and a location served by only one scheduled route. It may include code for determining that the timestamped location data corresponds to a time and a location served by several scheduled routes, and choosing a vehicle from among the several scheduled routes. The program code for determining the vehicle may also include code for determining that the vehicle is the same as a vehicle previously determined using location data from the location-aware device, or for correlating location data received from at least one other, co-moving location-aware device.

In another embodiment of the invention there is provided apparatus for providing information regarding a plurality of public transit vehicles, each vehicle in the plurality of vehicles having a scheduled route. The providing apparatus includes a receiver for receiving a collection of timestamped location data from a plurality of location-aware devices, each location-aware device possessed by an individual riding one of the plurality of public transit vehicles; a processor that is capable of (i) determining, for each vehicle in the plurality of vehicles, which location data corresponds to that vehicle, thereby determining a collection of stops remaining on the scheduled route of the vehicle, and (ii) computing, for each vehicle in the plurality of vehicles, an estimated time of arrival for a stop in the collection of stops; and a transmitter for transmitting at least one of the estimated times of arrival to a second device not in the plurality of location-aware devices.

Yet another embodiment provides apparatus for receiving information regarding a public transit vehicle in a plurality of such vehicles, each vehicle in the plurality of vehicles having a scheduled route. This receiving apparatus includes a first receiver for wirelessly receiving a plurality of data signals; a processor for processing the data signals to determine the location of the apparatus; a transmitter for transmitting data pertaining to the location of the apparatus to a computing device over a wireless communications network; and a second receiver for receiving, from the computing device, information regarding a public transit vehicle that is proximal to the apparatus.

In this receiving apparatus, the plurality of data signals need not contain data pertaining to the location of the apparatus. The first receiver and the second receiver may be the same. The transmitter and the second receiver may be part of a transceiver. And the information pertaining to public transit vehicles may contain information pertaining to the timeliness of the vehicles along the scheduled routes of those vehicles.

In one further embodiment, the apparatus may include an input device such as a keyboard, a button, a keypad, a camera, a microphone, or any combination of these. If so, the transmitter may be configured to transmit data that is input by an individual using the input device. In another further embodiment, the apparatus may include an output display for displaying the information pertaining to public transit vehicles. The output display may be a video display, an audio display, or a text display.

BRIEF DESCRIPTION OF THE SEVERAL VIEWS OF THE DRAWING

The foregoing features of the invention will be more readily understood by reference to the following detailed description, taken with reference to the accompanying drawings, in which.

DETAILED DESCRIPTION OF SPECIFIC EMBODIMENTS OF THE INVENTION

Definitions

As used in this description and the accompanying claims, the following terms shall have the meanings indicated, unless the context otherwise requires:

Location-aware device means any mobile device, such as a smartphone or PDA, that has the capability to determine its physical location and transmit that location to another (not necessarily mobile) device. Location may be determined using any techniques known in the art, including but not limited to triangulation using a plurality of Global Positioning System (GPS) satellites, triangulation using a network of cellular telephone towers, and triangulation by correlating a network of received WiFi signals with a map of known signals. Transmission may likewise be done using any technique known in the art, including, for example, communication with a satellite, communication with a network of cellular telephone towers, and communication with a local- or wide-area network, including the Internet.

Active Vehicle Location, or AVL, means a process for tracking the location of one or more vehicles using location-aware devices that are only transiently present in the tracked vehicles, and by extension, any software or system that implements such a process. A location-aware device that is configured to report its location in accordance with an AVL process is referred to as an AVL participating device. It is not necessary for a given device to be located on a vehicle to be an AVL participating device; for example, the given device may be in the possession of an individual waiting for a vehicle at a transit station, or at any other location.

In accordance with embodiments of the invention, many transient, location-aware devices are used to track the position of public transit vehicles. By relying on third party devices, a public transit operator can reduce the cost of installing, maintaining, and upgrading the vehicle tracking system. Heavy costs, such as data transmission fees, may be shifted from the operator to a large number of third party participant devices, thereby greatly reducing the cost to any individual device owner. In fact, fees for a certain amount of data transmission may be already covered in each device owner's service plan, and if the amount of data transmitted is kept within the plan, fees for transmission of vehicle tracking data may be entirely eliminated. Other costs, such as upgrading the location-aware software and hardware, are borne by individuals who perform these upgrades in order to own the latest technology, without requiring any prompting by the transit operator.

Figure 1:
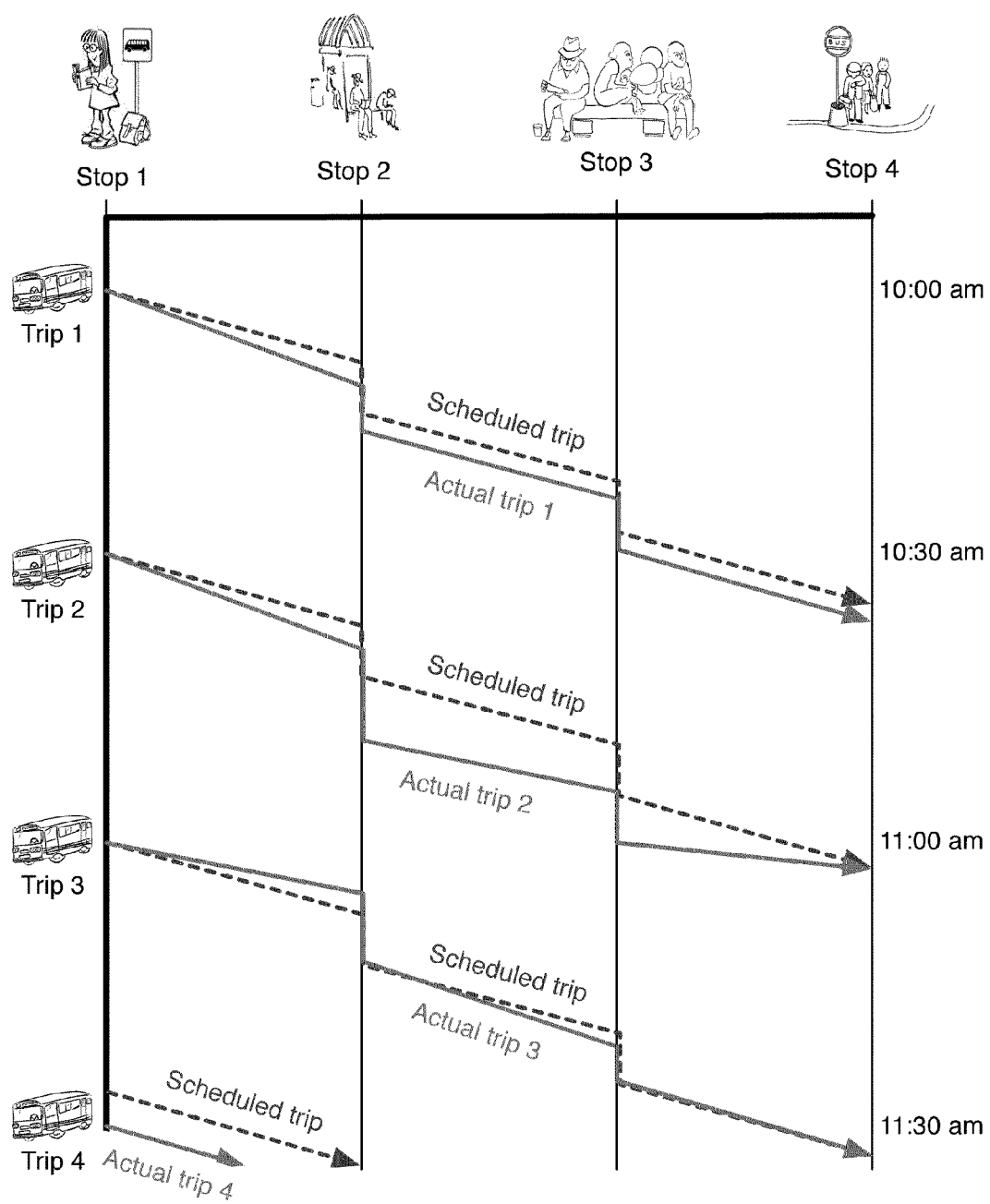
FIG. 1 is a diagram showing four bus trips that deviate from their respective published schedules.
Figure 2:
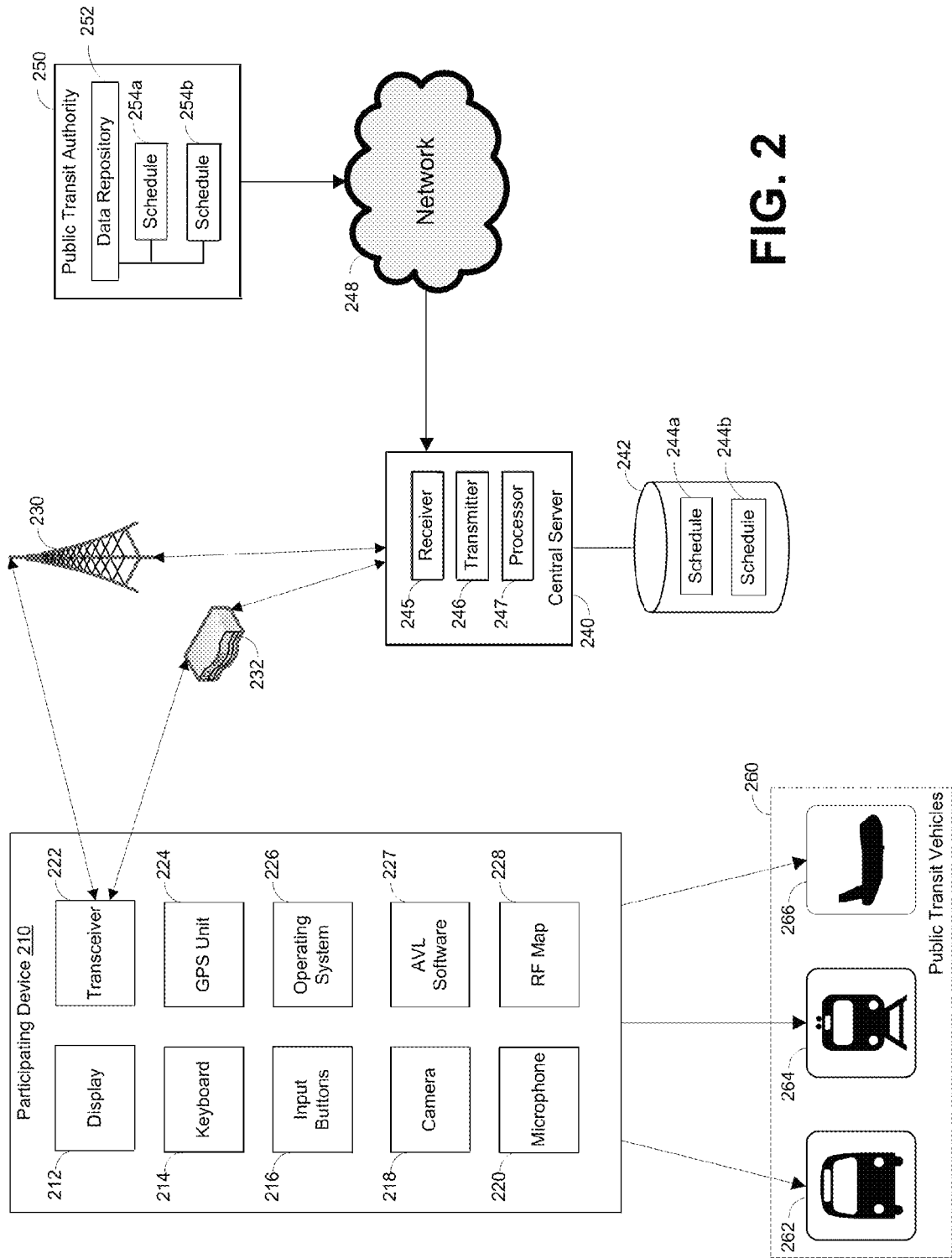
FIG. 2 is a block diagram showing a system for tracking such deviations in public transit vehicles in accordance with embodiments of the present invention.

FIG. 2 is a block diagram showing a system for tracking such deviations in public transit vehicles in accordance with embodiments of the present invention. In this system, an individual (not shown) possesses an AVL participating device 210. The device 210 can be any portable system capable of determining its physical location and transmitting that information to a central server 240. Systems that meet this requirement include, but are not limited to, some cellular telephones and laptops. It is expected that custom software installed on the location-aware wireless devices will be responsible for polling the host system for location information and using the host system's communication facilities to transmit the location information to the central server. For purposes of concrete illustration, the AVL participating device 210 is depicted with the components of a smartphone.

Smartphone 210 includes a number of hardware, firmware, and software components that allow it to be used in accordance with embodiments of the invention. The smartphone 210 has a display 212 which displays audio, video, or both. The smartphone 210 also has a number of user inputs, such as a keyboard 214, other input buttons 216 such as a keypad, a camera 218, and a microphone 220. Keyboard 214 and buttons 216 may be physical switches, or virtual switches displayed on display 212. Also, the smartphone 210 has a transceiver 222 for communicating with a wireless network, such as cellular telephone network 230 or through wireless access point 232.

The smartphone 210 will have a location positioning subsystem 224 for determining its location. This subsystem 224 may include, for example, a GPS unit that determines the location of the device by communicating with a series of GPS satellites. Or, the subsystem 224 may include a radio-frequency (RF) map of wireless access point identifiers and their coordinates, which may be used in conjunction with the transceiver to determine the location of the device. The subsystem 224 may also include other location-sensing devices such as an inertial navigation system, including motion sensors, or any other mechanism known in the art for determining device location. All of these components are controlled by an operating system 226, onto which applications and data may be loaded, such as AVL software 228.

It will be understood by persons having ordinary skill in the art that other AVL participating devices may have different combinations of functional components, and that smartphones are used in this written description for illustrative purposes only. One example of such a location-aware wireless device 210 is the iPhone™ mobile digital device from Apple Inc. of Cupertino, Calif. This device provides all of the necessary location sensing and communication capabilities and the ability to run custom software that uses them. Many other portable devices have similar capabilities, and more will be made available as government mandates to require cellular telephones to be able to pinpoint their physical location become more widespread.

The central server 240 is a networked computer or set of computers, able to communicate with the location-aware wireless devices 210 either via the public Internet or one or more private networks. This central server 240 includes common hardware such as a CPUs, storage disks, network adapters, etc., and common software services such as a database for storing the location and other reports sent by the location-aware wireless devices. It might be a general-purpose server running custom software, or it could be a specialized piece of hardware. In places where these components are not directly relevant to the operation of various embodiments of the invention, they are omitted from the figures for clarity.

Central server 240 may maintain a scheduling database 242, which contains schedules 244a, 244b of public transit vehicles. Central server 240 retrieves current schedules from one or more public transit authorities 250, such as a municipality or its agency. In order to facilitate distribution of the schedules, a public transit authority 250 provides central server 240 access, via a computer network 248, to a data repository 252 that contains current schedules 254a, 254b. The central server 240 may download schedules on a regular basis, or upon notification of a schedule change, for example by an RSS feed notification. Alternately, the central server 240 may not keep a scheduling database 242, and simply maintains a database of times and locations reported by location-aware wireless devices 210. This latter embodiment may be used, for example, when no published schedule of routes is available.

Central server 240 generally includes a receiver 245, a transmitter 246, and a processor 247. In some embodiments, receiver 245 and transmitter 246 may be combined in a single transceiver. The receiver 245 and transmitter 246 communicate with the cellular telephone network 230, wireless access point 232, and network 248 to communicate with the AVL participating devices 210 and the data repository 252. Processor 247 is used to carry out the various methods in accordance with embodiments of the invention. For example, processor 247 coordinates storing and retrieving schedules 244 from database 242, parses and indexes schedules retrieved from data repository 252, and correlates location data with the schedules to determine vehicle timeliness, among other functions. A person having ordinary skill in the art will understand that central server 240 may have other components commonly found in such systems, such as computer memory and a display. These other components are omitted for clarity.

An AVL participating device 210 reports its location data to central server 240. Central server 240 uses the current vehicle route schedules 244 to determine where public transit vehicles, such as bus 262, train 264, airplane 266, and boat 268, should be at any given time. Armed with this information, and time and place data received from a multitude of participating devices 210 carried aboard public transit vehicles 260, central server 240 can calculate how far ahead or how far behind schedule any given vehicle is, as described in more detail below.

Figure 3:
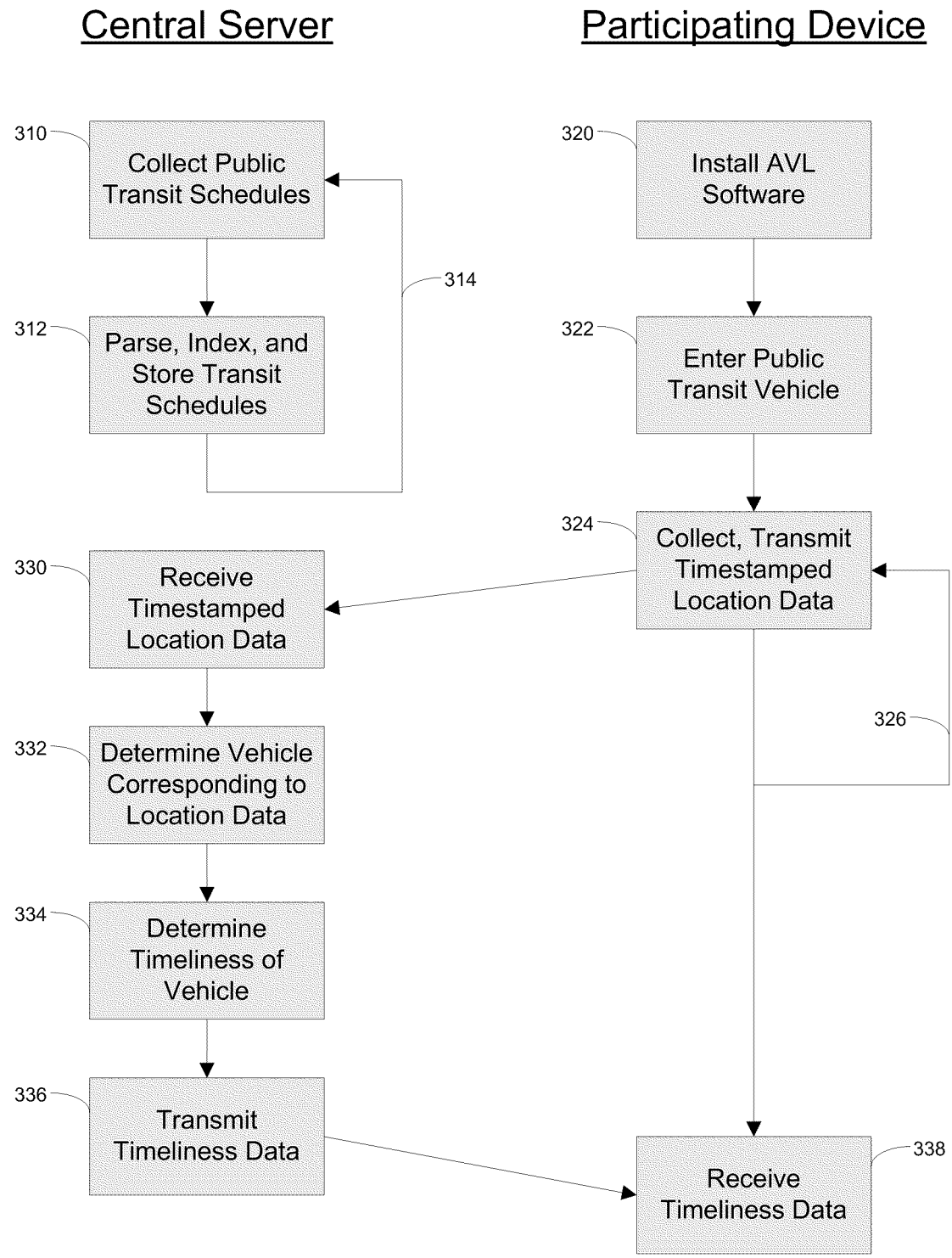
FIG. 3 is a flowchart of a method for tracking the deviations, and distributing them to interested individuals, in accordance with various embodiments of the invention.

FIG. 3 is a flowchart of a method for tracking transit schedule deviations, and distributing them to interested individuals, in accordance with various embodiments of the invention. In process 310, central server 240 collects schedules 254 published in a standard format by public transit agency 250. One such format is the Google Transit™ Feed Specification, which may be obtained from the Google Code™ open source developer site. Information collected includes information about the transit agency, route geographies, vehicle stop locations, and vehicle stop schedules. In process 312, these schedules are parsed and indexed by server 240 and stored in central database 242 As indicated by arrow 314, these schedules are periodically refreshed by performing processes 310, 312 repeatedly.

Meanwhile, in process 320 custom AVL software is made publicly available and installed on many AVL participating devices, such as smartphone 210. This software is capable of automatic detection of its current geographic location by querying the local device operating system 226, which in turn uses whatever facilities are made available by the location positioning subsystem 224. These include, but are not limited to, a GPS unit, cell tower triangulation using onboard transceiver 222 or another RF device, using an inertial navigation system, and using a WiFi-based urban map. Such urban maps include, for example, the Wifi-based Positioning Solution (WiPS) from Spotigo GmbH of Dusseldorf, Germany, and the Wi-Fi Positioning System (WPS) from Skyhook Wireless, Inc. of Boston, Mass. The AVL software 228 may also be capable of collecting user-entered information about public transit vehicles 260, including but not limited to manual specification of the transit route or transit vehicle ID, manual specification of the timeliness or tardiness of the vehicle, descriptions or pictures of how full or how dirty the vehicle is, or descriptions of recordings of how noisy or quiet the vehicle is. This information may be entered using, for example, keyboard 214, microphone 220, or even camera 218.

In optional process 322, an individual having an AVL participating device 210 enters a public transit vehicle, such as bus 262. An individual waiting at a vehicle station may participate in the remaining steps without entering a vehicle, thus skipping process 322. Geographic location and optional user-entered information is collected by the AVL software 228, time stamped, and transmitted to the central server in process 324, again using the wireless data transmission facilities of the local operating system 226. As shown by arrow 326, information collected by the AVL software is transmitted to the central server periodically, either on a regular timed schedule, when fresh data becomes available, or when the transmission network is available. In this way, the system maintains current location awareness of all of the AVL participating devices.

Returning to the central server 240, in process 330 information is collected from AVL software 228. In practice, the central server will receive information from a large population of AVL participating devices 210, operated by users who may or may not be on public transit vehicles (depending on whether each user executed process 322).

In process 332, the central server compares geographic location and user-entered data with published schedules to determine what transit route the geographic location and user-entered data applies to. A wide variety of indicators are available to the central server for this calculation, and these may be combined as weighted probabilities. For example:

1) A route manually entered by the end user could be deemed to be trustworthy if not contradicted by other information.

2) Observing that the present geographic location of AVL participating smartphone 210 is only served by a single transit route, for example the route of schedule 244b, could imply that it is on a transit vehicle serving that route or held by a user that is waiting for such a vehicle.

3) Observing an AVL participating smartphone that was observed to be on a specific route shortly before, can imply that the smartphone 210 is still on that route if all its locations since the previous observation allow for that possibility by not deviating from the route as published by the transit agency.

4) Multiple AVL participating smartphones 210 observed to be traveling in concert, or co-moving (i.e., repeatedly observed to be at the same location, plus or minus the length of a vehicle, subject to the AVL participating smartphones' location accuracy) can imply that they are on the same public transit vehicle, and add trustworthiness to decisions based on such an implication.

5) Large deviations from the published schedule while still being on the physical route can imply the individual having AVL participating smartphone 210 is not currently on a vehicle, but instead may be walking the route.

6) An AVL participating smartphone 210 that was recently observed to be at the same location can imply that it is stationary and likely not on a vehicle. Or, it can imply that the vehicle is stuck in traffic, or at a regularly scheduled stop. These various options can be eliminated using the schedule data, or data obtained from other sources, such as traffic data.

Once specific smartphones 210 are believed to be on a vehicle following a known route using a weighted combination of these factors, they can be assigned to specific scheduled public transit vehicles 260 on those routes, or deemed to be on vehicles that are either unscheduled far enough from their scheduled time to be effectively unscheduled. This information is recorded in the central server 240.

In process 334 the vehicle's present position is compared with its scheduled position along the route, to determine how many minutes ahead or behind schedule the particular vehicle is. This determination may be made using known methods. For example, if a schedule only includes arrival and departure times at a particular stop and the distance between stops, the vehicle's scheduled time at any given location between stops may be calculated using a simple interpolation, or using more complex methods that take into account traffic patterns, speed limits, or other data. This other data may be obtained from other sources according to methods known in the art. The result of the above calculations is a combination of the present or past location of specific vehicles that are proximal to the participating device 210, and manually entered notes from other end users about the location, timeliness, or condition of the specific vehicles. Proximity limits on the data, such as distance of the vehicles from the participating device, may be adjusted by the central server 240 or by the participating device 210 to reduce the amount of bandwidth required or the amount of information that must be displayed to an end user.

In process 336, this information is relayed to the participating device 210, using the same custom AVL software 228 and network that was used to submit the data. Additionally, the information can be provided to other individuals using Internet web sites, sent to other devices such as large custom displays at scheduled vehicle transfer points, or otherwise sent to end users with smartphones who are waiting for transit vehicles. It should be noted that other information may be provided to end users as well, including for example a list of shops or restaurants near the participating device, a map of the surrounding area showing their locations, a local traffic map, an advertisement, an address to a website that can display any of these, or any other timely information that may be useful or interesting to the user of a participating device. It should also be noted that the information can be provided in many different forms, including data, actual or synthesized human voice, other audio such as music or tones, and dynamically-generated images or video with optional accompanying audio.

In process 338, the timeliness information is received by the participating device 210, and additional steps may be taken. For example, a message regarding the timeliness information may be displayed, e.g. "Your train is running 13 minutes behind schedule" or "You will arrive at your destination at approximately 3:32 pm." Or, a web site may be automatically displayed in browser software loaded on the participating device. A message or sound may be displayed on the device, reminding its user to call another person to let the person know that the user of the device is running late. Or, a text message to that effect may be automatically delivered from the participating device to the other person. Information about local restaurants or shops may be correlated with the stored preferences of the device's owner, and a recommendation displayed. A person having ordinary skill in the art will appreciate many other uses of the received timeliness data that are within the scope of the invention.

In an alternate embodiment, no published routes or schedules are available to central server 240. In this case, rather than execute process 334, the time and location information for a given vehicle, as reported by individual devices 210, may be aggregated by the central server 240 and reported in process 338 to any requesting device 210. While not providing the ability to estimate arrival times, this embodiment can still determine useful information about, for example, traffic density and commute times generally.

Using previous systems, end users could obtain vehicle scheduling information without any corroborating reports from AVL participating smartphones. In accordance with embodiments of the present invention, however, an end user waiting for a vehicle may obtain, from an AVL participating smartphone determined to be currently on the vehicle, a report of the current location of that vehicle. The end user may also obtain a report of a delayed vehicle from another user at a different pickup point "upstream" from the end user. Thus, for example, a person who is about to depart for an airport to take a flight can get information that the equipment scheduled to be used for the flight was delayed at another airport.

The location information and user-generated data can also be relayed to the transit agency 250 itself. For instance, a report from a user via this system regarding a delayed or dirty bus can be automatically emailed or otherwise submitted to the transit agency 250 in a timely manner, allowing the agency to address the issue or keep its own statistics regarding its vehicle fleet.

Persons of ordinary skill in the art will appreciate that embodiments of this method require no specific process for determining geographic location, data collection from the end user, or communication with a central server, and that the figures are illustrative only. Location can be determined using whatever method is convenient for the smartphone platform's operating system 226. Typically, the device operating system 226 will isolate the details of the wireless connection from the AVL software 228 and allow the AVL software to submit the geographic location and user-entered data to the central server using any standard Internet protocol, including HTTP or FTP, or a proprietary protocol developed for use with the AVL software 228.

Figure 4:
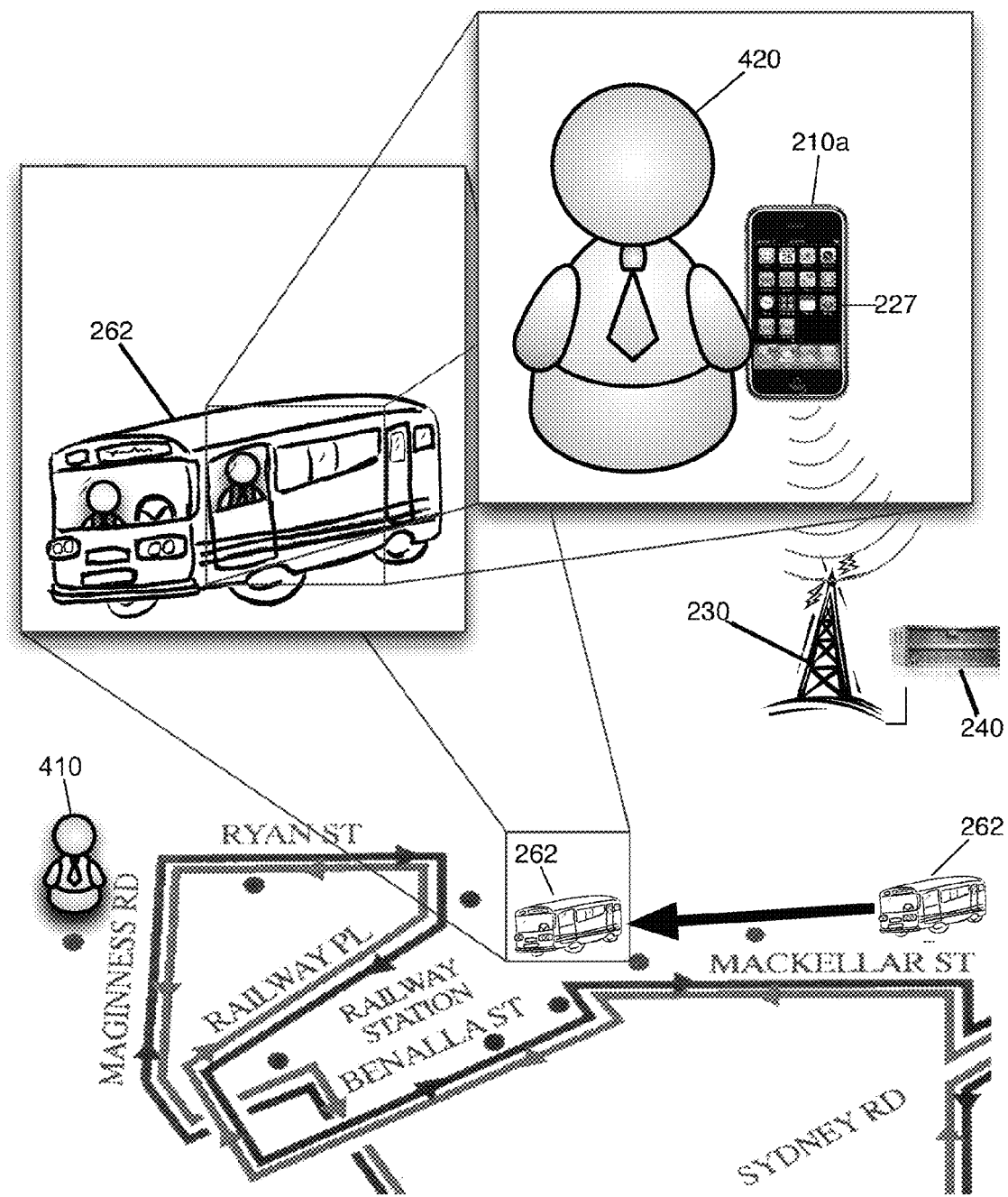
FIG. 4 depicts the physical relationships between relevant system elements during one step in an embodiment of the method of FIG. 3.

FIG. 4 depicts the physical relationships between system elements during step 324 in an embodiment of the method of FIG. 3. A bus 262 is shown here traveling along MacKellar St. from one stop to another, while a rider 410 waits along Maginness Rd. In magnified insets in the diagram, multiple occupants 420 are shown riding the bus, some of whom are in possession of location-aware smartphones 210. One smartphone 210a is shown relaying its location to a nearby radio tower 230, a significant piece of existing infrastructure allowing communication between the custom AVL software 228 executing on the smartphone 210a and the central server 240 at the other end of the communication channel. The smartphone 210a periodically updates the central server regarding its location and other, user-entered, information as the bus travels along its route.

Figure 5:
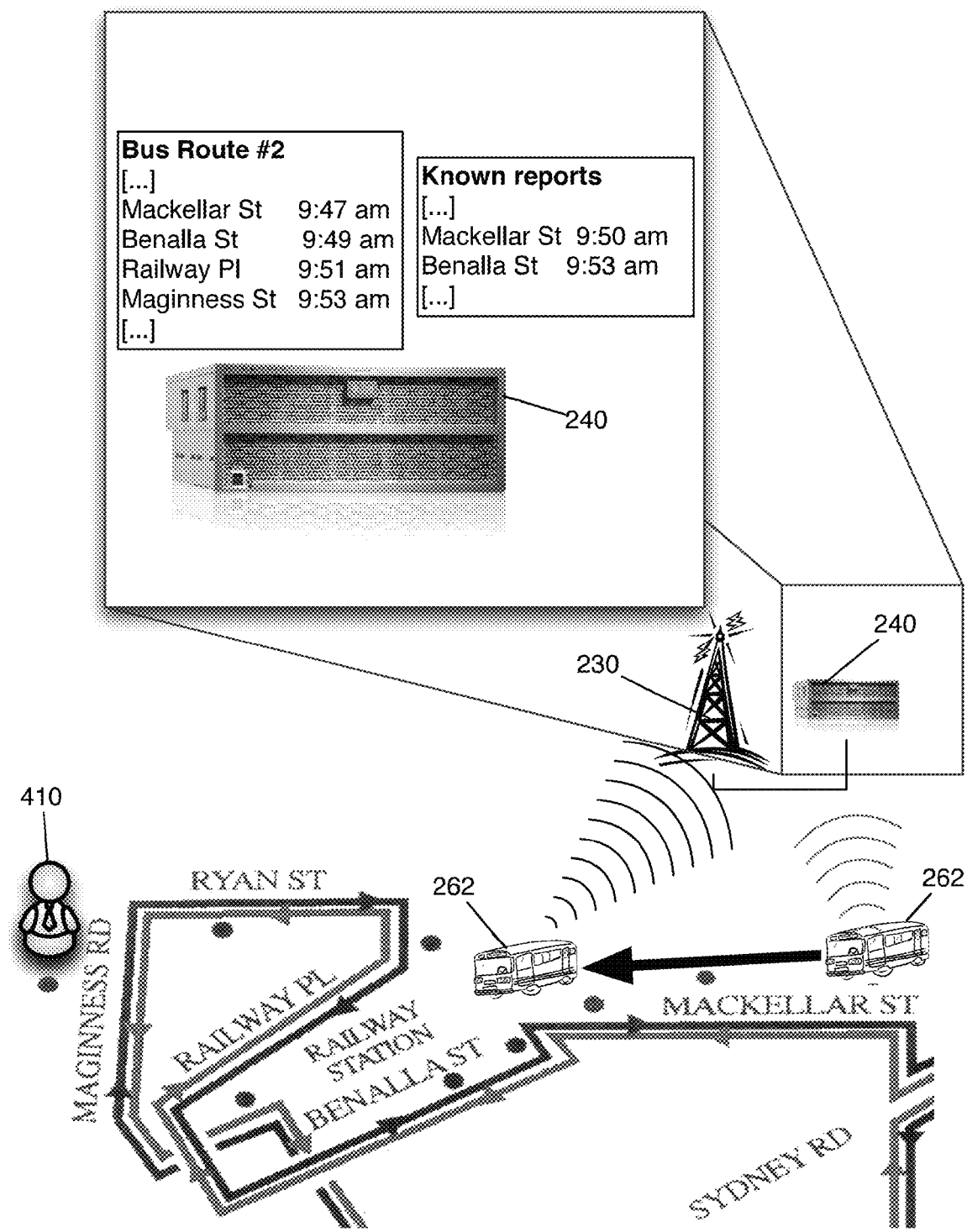
FIG. 5 depicts the same during another step in an embodiment of the method of FIG. 3.

FIG. 5 depicts steps 330 to 334 in an embodiment of the method of FIG. 3. The central server 240 keeps up to date with published schedules either by periodically checking central repositories of public transit schedules, or by having schedules transmitted to it from transit agencies 250. When location reports come in from AVL participating smartphones on board public transit vehicles 262, for example via cell tower 230, they are compared to the schedules to determine likely transit vehicle deviations for relay to waiting rider 410.

Figure 6:
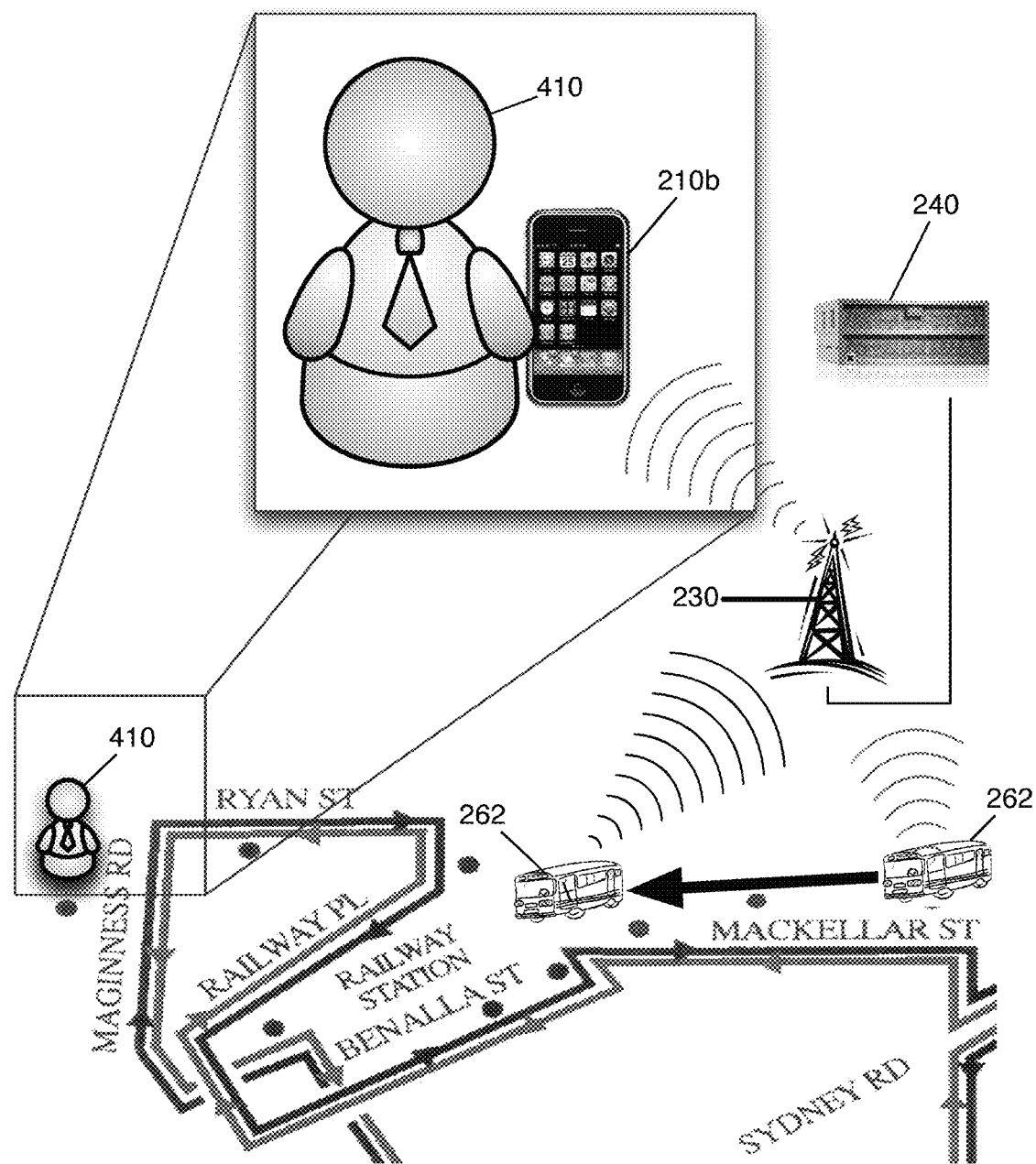
FIG. 6 depicts the same during a third step in an embodiment of the method of FIG. 3.

FIG. 6 depicts steps 336 and 338 in an embodiment of the method of FIG. 3. The smartphone 210b of rider 410 receives information from the central server 240 wirelessly via cell tower 230, allowing rider 410 to be informed of both the published schedules for the vehicle 262 they are waiting for, and reports from other AVL participating smartphones 210 regarding the status of the vehicle 262. It will be understood that any portable, network-capable device may be used in place of smartphone 210b to receive these reports. However, if rider 410 has a smartphone or other location-aware device, rider 410 can participate in tracking vehicle 262, thereby enhancing the efficiency and reliability of the overall system.

Figure 7:
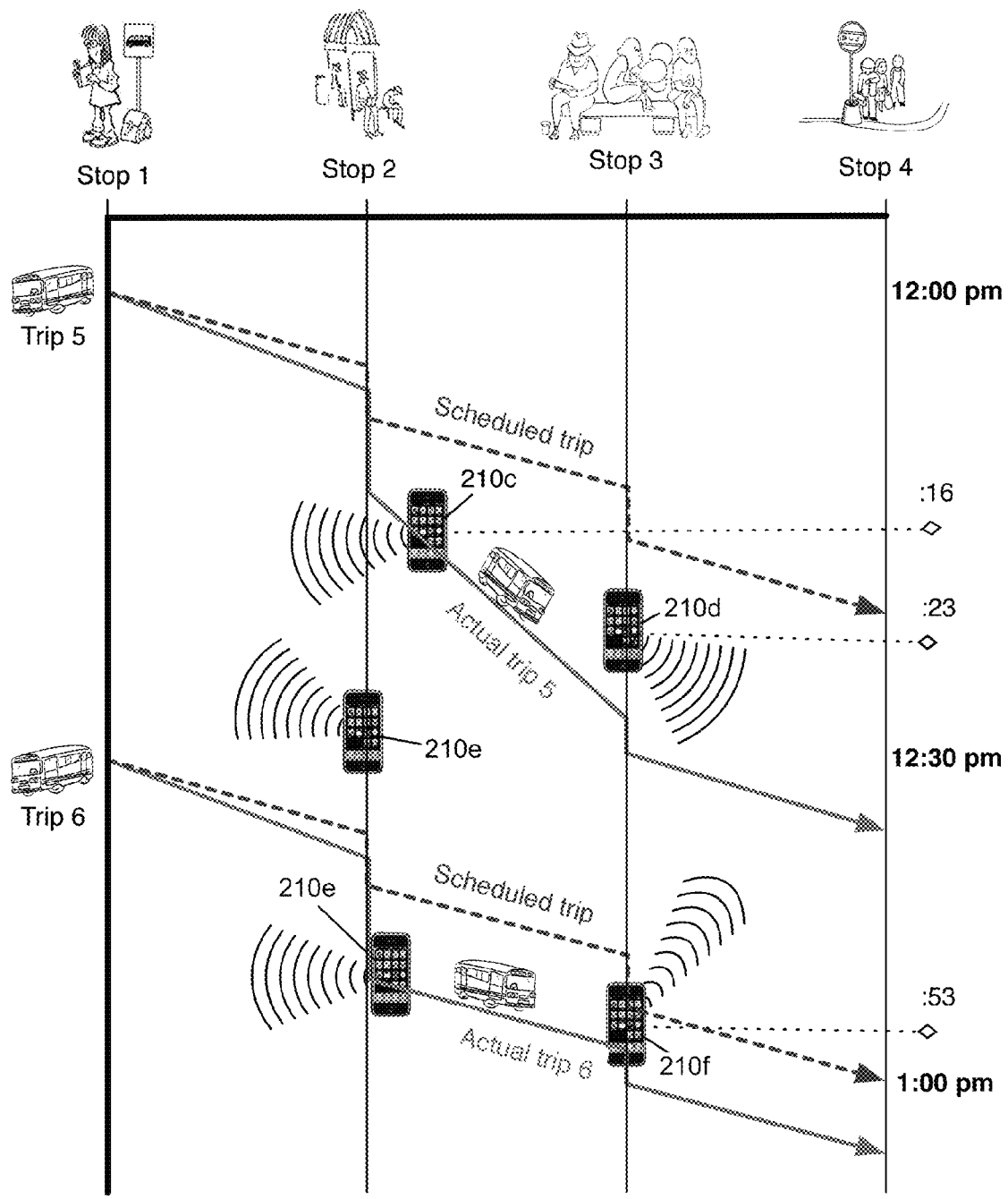
FIG. 7 is a diagram showing an embodiment of the invention in which schedule deviations and optional user comments are reported to interested individuals.

FIG. 7 illustrates vehicles deviating from their published schedules, and AVL participating smartphones 210 notifying their owners and the central server of relevant information regarding vehicle schedules, in accordance with embodiments of the invention. Trip #5 departs stop #1 on time at 12:00 pm but moves slowly between stops #1 and #2 and arrives a few minutes late at stop #2. It spends excessive time unloading and loading passengers at stop #2, and leaves quite late at 12:14 pm. It then encounters very heavy traffic between stops #2 and #3, and moves very slowly. User #1, on this vehicle, checks his AVL participating smartphone 210c for status, and the smartphone 210c reports its location and time to the central server at 12:16 pm. The central server at this point has the default schedule data but no other reports about this route, so it decides in accordance with the method shown in FIG. 3 that, since AVL participating smartphone 210c is geographically at a known point on the route, it is on the nearest-scheduled vehicle, specifically trip #5 running late. The server records that trip #5 is running five minutes late, and reports to the device 210c the scheduled times for stops #3 and #4, plus the fact that the vehicle is running five minutes behind schedule.

Seven minutes later at 12:23 pm, user #2, waiting at stop #3, checks her AVL participating smartphone 210d because trip #5 is very tardy to that stop. The system is able to report that the vehicle had been scheduled to arrive at stop #3 nine minutes earlier, but it was running five minutes late at 12:16 pm, shortly after stop #2. Based on the inquiry by device 210d, the system then records that the vehicle is still not at stop #3, nine minutes after it was scheduled to arrive, so it is then known for future inquiries to be running at least nine minutes late.

At 12:30 pm user #3, walking up to stop #2, checks his AVL participating smartphone 210e for public transit information. The system has no reports about trip #6, but it does report that the next bus is due to leave stop #2 eight minutes later. Using this information, user #3 is able to go into a nearby store and make a purchase before the bus arrives and departs, while his AVL participating smartphone 210e continues to regularly report location data.

Trip #6 actually arrives one minute late and departs five minutes late with user #3 on it. His AVL participating smartphone 210e automatically reports its location and time shortly after it has left stop #2, and the central server records that the vehicle departed stop #2 five minutes late. At 12:53 pm, user #4, waiting at stop #3, checks her AVL participating smartphone 210f for updated information and is told that trip #6 was running five minutes late when it left stop #2. Shortly thereafter, trip #6 arrives at stop #3, and user #4 boards the vehicle.

The present invention may be embodied in many different forms, including, but in no way limited to, programmable logic for use with a programmable logic device (e.g., a Field Programmable Gate Array (FPGA) or other PLD), discrete components, integrated circuitry (e.g., an Application Specific Integrated Circuit (ASIC)), or other appropriate means including any combination thereof. Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed permanently in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The embodiments of the invention described above are intended to be merely exemplary; numerous variations and modifications may become apparent to those skilled in the art based on the teachings of this disclosure. All such variations and modifications are intended to be within the scope of the present invention as defined in any appended claims. Any references to the "invention" are intended to refer to exemplary embodiments of the invention and should not be construed to refer to all embodiments of the invention unless the context otherwise requires.

What is claimed is:

1. A method for providing information to an individual who is riding as a passenger on a given vehicle in a plurality of public transit vehicles, each vehicle in the plurality of public transit vehicles having a scheduled route, the method comprising:
   receiving timestamped location data from a location-aware device possessed by the individual;
   in a first computer process, determining a route of an unknown vehicle in the plurality of vehicles as a function of the received timestamped location data;
   in a second computer process, determining that the unknown vehicle is the given vehicle by comparing the determined route of the unknown vehicle to the scheduled routes of one or more vehicles in the plurality of public transit vehicles; and
   transmitting, to the location-aware device, information regarding the timeliness of the given vehicle along its scheduled route.

2. The method of claim 1, wherein the given vehicle is an automobile, a bus, a train, an airplane, or a boat.

3. The method of claim 1, wherein the location-aware device is a smartphone.

4. The method of claim 1, wherein determining that the unknown vehicle is the given vehicle includes receiving, from the location-aware device, a textual identifier of the vehicle.

5. The method of claim 1, wherein determining that the unknown vehicle is the given vehicle includes determining that the timestamped location data corresponds to a location served by only one scheduled route.

6. The method of claim 1, wherein determining that the unknown vehicle is the given vehicle includes determining that the timestamped location data corresponds to a combined time and location unambiguously served by only one scheduled route.

7. The method of claim 1, wherein determining that the unknown vehicle is the given vehicle includes:
   determining that the timestamped location data corresponds to a time and a location served by several scheduled routes; and
   choosing a route from among the several scheduled routes.

8. The method of claim 1, wherein determining that the unknown vehicle is the given vehicle includes determining that the given vehicle is the same as a vehicle previously determined using location data from the location-aware device.

9. The method of claim 1, wherein determining that the unknown vehicle is the given vehicle includes correlating location data received from at least one other, co-moving location-aware device.

10. The method of claim 1, wherein transmitting the information includes transmitting an estimated time of arrival at a regular stopping location along the route.

11. The method of claim 10, wherein the regular stopping location is the individual's final destination on the given vehicle.

12. The method of claim 1, further comprising:
   transmitting second information regarding the timeliness of the given vehicle along its scheduled route to a device possessed by a second individual.

13. The method of claim 12, wherein transmitting the second information comprises transmitting data, an actual or synthesized human voice, musical tones, or dynamically-generated images or video.

14. The method of claim 12, further comprising:
   receiving, from the first individual's location-aware device, second information relating to a condition of the given vehicle or its passengers; and
   transmitting the second information to the device possessed by the second individual.

15. A method for providing information regarding a plurality of public transit vehicles, each vehicle in the plurality of public transit vehicles having a scheduled route, the method comprising:
   receiving timestamped location data from a plurality of location-aware devices, each location-aware device possessed by an individual riding one of the plurality of public transit vehicles;
   in a first computer process, for each given vehicle in the plurality of vehicles, determining a location of the given vehicle as a function of the received timestamped location data, thereby determining a collection of stops remaining on the scheduled route of the vehicle;
   in a second computer process, for each given vehicle in the plurality of vehicles, computing an estimated time of arrival for a stop in the collection of stops as a function of the location of the given vehicle and a timestamp in the received timestamped location data; and
   transmitting at least one of the estimated times of arrival to a second device not in the plurality of location-aware devices.

16. The method of claim 15, wherein at least one location-aware device in the plurality of location-aware devices is a smartphone.

17. The method of claim 15, wherein the second device is not located within any of the plurality of public transit vehicles.

18. The method of claim 15, wherein determining which location data corresponds to a given vehicle includes receiving, from a location-aware device, a textual identifier of the given vehicle.

19. The method of claim 15, wherein determining which location data corresponds to a given vehicle includes correlating location data received from a plurality of location-aware devices possessed by individual riders of the given vehicle.

20. The method of claim 15, further comprising:
   transmitting information regarding the timeliness of one of the vehicles along its scheduled route to the second device.

21. The method of claim 20, further comprising:
   receiving, from the location-aware devices possessed by a plurality of individuals riding on one of the plurality of public transit vehicles, information relating to a condition of the vehicle or its passengers; and
   transmitting the information to the second device.

22. The method of claim 15, wherein the second device is a location-aware device.

23. A computer program product, embodied in a tangible, computer-readable medium, the computer program product comprising:
   program code for receiving timestamped location data from a plurality of location-aware devices, each location-aware device possessed by an individual riding one of the plurality of public transit vehicles;
   program code for determining, for each given vehicle in the plurality of vehicles, a location of the given vehicle as a function of the received timestamped location data, thereby determining a collection of stops remaining on the scheduled route of the vehicle;
   program code for computing, for each given vehicle in the plurality of vehicles, an estimated time of arrival for a stop in the collection of stops as a function of the location of the given vehicle and a timestamp in the received timestamped location data; and
   program code for transmitting at least one of the estimated times of arrival to a second device not in the plurality of location-aware devices.

24. The computer program product of claim 23, wherein the program code for determining the vehicle uses a textual identifier of the vehicle received from the location-aware device.

25. The computer program product of claim 23, wherein the program code for determining the vehicle includes program code for determining that the timestamped location data corresponds to a time and a location served by only one scheduled route.

26. The computer program product of claim 23, wherein the program code for determining the vehicle includes program code for:
   determining that the timestamped location data corresponds to a time and a location served by several scheduled routes; and choosing a vehicle from among the several scheduled routes.

27. The computer program product of claim 23, wherein the program code for determining the vehicle includes program code for determining that the vehicle is the same as a vehicle previously determined using location data from the location-aware device.

28. The computer program product of claim 23, wherein the program code for determining the vehicle includes program code for correlating location data received from at least one other, co-moving location-aware device.

29. Apparatus for providing information regarding a plurality of public transit vehicles, each vehicle in the plurality of public transit vehicles having a scheduled route, the apparatus comprising:
- a receiver for receiving timestamped location data from a plurality of location-aware devices, each location-aware device possessed by an individual riding one of the plurality of public transit vehicles;
- a processor that is capable of (i) determining, for each given vehicle in the plurality of vehicles, a location of the given vehicle as a function of the received timestamped location data, thereby determining a collection of stops remaining on the scheduled route of the vehicle, and (ii) computing, for each given vehicle in the plurality of vehicles, an estimated time of arrival for a stop in the collection of stops as a function of the location of the given vehicle and a timestamp in the received timestamped location data; and
- a transmitter for transmitting at least one of the estimated times of arrival to a second device not in the plurality of location-aware devices.

30. A method for providing information to an individual who is waiting to ride as a passenger on a given vehicle in a plurality of public transit vehicles, each vehicle in the plurality of public transit vehicles having a scheduled route, the method comprising:
- receiving timestamped location data from a location-aware device possessed by the individual;
- in a first computer process, determining one or more of the scheduled routes that service a location in the received timestamped location data;
- in a second computer process, choosing the route of the given vehicle from the one or more determined routes, thereby identifying the given vehicle, by comparing the one or more determined routes to a timestamp received in the timestamped location data; and
- transmitting, to the location-aware device, information regarding the timeliness of the given vehicle along its scheduled route.

31. The method of claim 30, wherein the given vehicle is an automobile, a bus, a train, an airplane, or a boat.

32. The method of claim 30, wherein the location-aware device is a smartphone.

33. The method of claim 30, wherein determining one or more of the scheduled routes includes receiving, from the location-aware device, a textual identifier of the vehicle.

34. The method of claim 30, wherein determining one or more of the scheduled routes includes determining that the timestamped location data corresponds to a location served by only one scheduled route.

35. The method of claim 30, wherein determining one or more of the scheduled routes includes determining that the timestamped location data corresponds to a combined time and location unambiguously served by only one scheduled route.

36. The method of claim 30, wherein determining one or more of the scheduled routes includes:
- determining that the timestamped location data corresponds to a time and a location served by several scheduled routes; and
- choosing a route from among the several scheduled routes.

37. The method of claim 30, wherein determining one or more of the scheduled routes includes correlating location data received from at least one other location-aware device.

38. The method of claim 30, wherein transmitting the information includes transmitting an estimated time of arrival at a regular stopping location along the route.

39. The method of claim 38, wherein the regular stopping location is the individual's final destination on the given vehicle.

* * * * *